US008137598B2

(12) United States Patent
Perrone

(10) Patent No.: US 8,137,598 B2
(45) Date of Patent: Mar. 20, 2012

(54) SPREADER BOX APPARATUS AND METHOD OF FORMING BI-LAMINAR PAINTBALL SHELL MATERIAL AND PAINTBALLS FOR USE WITH PAINTBALL GUN

(75) Inventor: Aldo Perrone, Brampton (CA)

(73) Assignee: KEE Action Sports Technology Holdings, LLC, Sewell, NJ (US)

( * ) Notice: Subject to any disclaimer, the term of this patent is extended or adjusted under 35 U.S.C. 154(b) by 890 days.

(21) Appl. No.: 12/043,912

(22) Filed: Mar. 6, 2008

(65) Prior Publication Data

US 2008/0217812 A1   Sep. 11, 2008

Related U.S. Application Data

(60) Provisional application No. 60/893,263, filed on Mar. 6, 2007.

(51) Int. Cl.
 *B32B 43/00* (2006.01)
 *B32B 37/00* (2006.01)
 *B29C 69/00* (2006.01)
 *F42B 8/00* (2006.01)

(52) U.S. Cl. .............. 264/36.12; 264/37.3; 264/40.4; 264/40.7; 264/171.1; 264/171.26; 264/171.27; 264/172.19; 264/173.16; 264/212; 264/216; 264/241; 102/489; 102/502; 102/513; 102/517; 222/145.3

(58) Field of Classification Search .............. None
See application file for complete search history.

(56) References Cited

U.S. PATENT DOCUMENTS

| | | | | |
|---|---|---|---|---|
| 1,924,010 A | * | 8/1933 | Wickham | 425/447 |
| 2,449,139 A | | 9/1948 | Posner | |
| 2,596,176 A | | 5/1952 | Scherer | |
| 2,623,494 A | | 12/1952 | Scherer | |
| 2,688,775 A | | 9/1954 | Scherer et al. | |
| 2,703,047 A | | 3/1955 | Scherer et al. | |
| 2,774,988 A | * | 12/1956 | Stirn et al. | 425/223 |
| 2,815,533 A | * | 12/1957 | Ericson | 425/147 |
| 2,928,128 A | * | 3/1960 | Carlson et al. | 156/243 |
| 3,203,347 A | | 8/1965 | Hansen et al. | |
| 3,214,840 A | | 11/1965 | Fox | |
| 3,333,031 A | | 7/1967 | Vincent, Jr. et al. | |
| 3,579,734 A | * | 5/1971 | Mehta | 425/147 |

(Continued)

FOREIGN PATENT DOCUMENTS

CA   2499293   3/2005

*Primary Examiner* — Jeffrey Wollschlager
(74) *Attorney, Agent, or Firm* — Volpe and Koenig, P.C.

(57) ABSTRACT

A spreader box and method form a bi-laminar paintball shell material. Walls of a box body define a reservoir containing, and an aperture dispensing, a first gel. Walls of a gate body define a reservoir containing, and an aperture dispensing, a second gel. Within the box, the first gel is kept separate from the second gel. The box body aperture dispenses the first gel as a continuous first layer. The gate body aperture dispenses the second gel as a continuous second layer that is adjacent and juxtaposed with the first layer, such that the first gel bonds with the second gel to form the bi-laminar paintball shell material. A paintball, containing a fill material, has a frangible bi-laminar shell including an exterior shell that completely surrounds and contains an interior shell. The paintball is adapted to withstand the normal range of forces sustained in being fired from a paintball gun.

11 Claims, 14 Drawing Sheets

U.S. PATENT DOCUMENTS

| | | |
|---|---|---|
| 4,656,092 A * | 4/1987 | Haman et al. ............... 428/402.2 |
| 4,817,367 A * | 4/1989 | Ishikawa et al. ................. 53/454 |
| 5,672,300 A | 9/1997 | Schurig et al. |
| 5,814,338 A * | 9/1998 | Veronesi ........................ 424/472 |
| 6,022,499 A | 2/2000 | Schurig et al. |
| 6,183,845 B1 * | 2/2001 | Ikemoto ......................... 428/213 |
| 6,569,363 B1 | 5/2003 | Schurig et al. |
| 6,729,867 B2 * | 5/2004 | Peter et al. .................... 425/132 |
| 6,769,226 B2 | 8/2004 | Holland et al. |
| 6,797,201 B2 | 9/2004 | Dugand |
| D527,062 S | 8/2006 | Danta |
| 2003/0056667 A1 | 3/2003 | Cruttenden et al. |
| 2003/0127760 A1 | 7/2003 | Schurig et al. |
| 2005/0035475 A1 | 2/2005 | Dugand |
| 2005/0191346 A1 * | 9/2005 | Nowak et al. .................. 424/451 |
| 2005/0237371 A1 | 10/2005 | Danta |

* cited by examiner

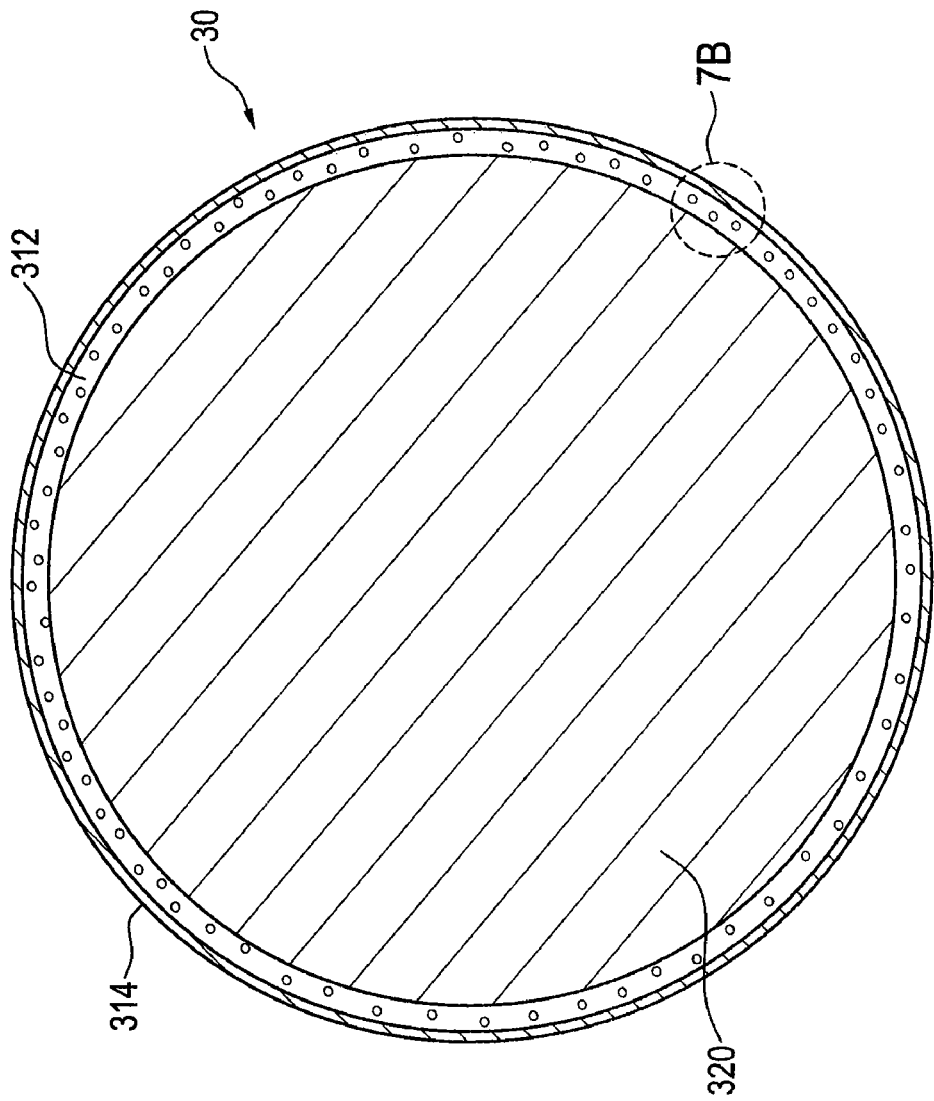

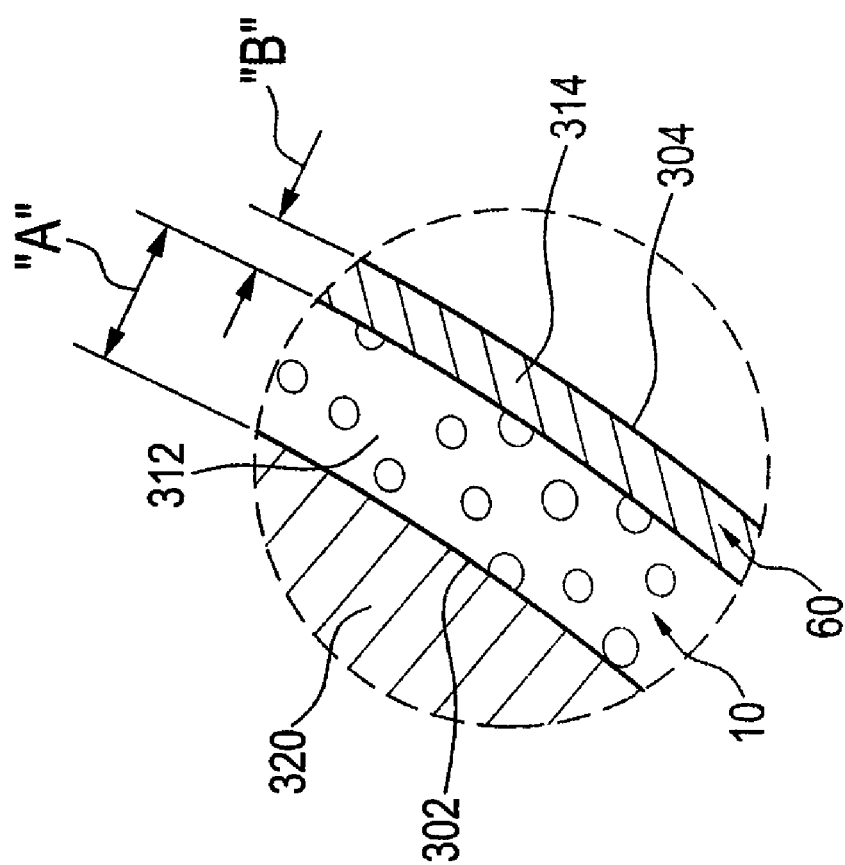

SPREADER BOX APPARATUS AND METHOD OF FORMING BI-LAMINAR PAINTBALL SHELL MATERIAL AND PAINTBALLS FOR USE WITH PAINTBALL GUN

FIELD OF THE INVENTION

The present invention relates generally to the field of softgel capsules, and more particularly to a paintball or other softgel capsule having a bi-laminar shell and to a method and apparatus for manufacturing same.

BACKGROUND OF THE INVENTION

Paintball enthusiasts have participated in paintball practices, games and competitions for a number of decades. In these games, paintballs ordinarily sustain a range of forces in being shot out of specially designed guns using compressed gases. Typically, in paintball games, players on a paintball team will attempt to shoot the players of another team with such a paintball. Prior art paintballs may have included a frangible paintball shell (typically made from a gelatin) encapsulating a discrete paintball fill material. When the paintball impacts upon a surface, its shell may preferably have been designed to be break open and release the paintball fill material onto the impacted surface. (Depending on the fill material and the surface characteristics, damage and/or staining may have occurred.) When the paintball strikes an opposing player, the paintball may have preferably shattered and released the paintball fill material (e.g., paint) onto the player. Preferably, the paintball fill material may have left a mark sufficient to identify the marked player as having been disqualified from continuing the game.

In the formation of paintballs and other softgel capsules, it may have been known in the prior art to use a spreader box to dispense a gel (e.g., gelatin) from a spreader box opening onto a casting drum. The casting drum operatively rotates and carries the dragged gel from the spreader box opening, about a casting drum center of rotation, to solidify and form a gel ribbon (hereinafter alternately referred to as a web of paintball shell material). A pair of gel ribbons is drawn away from their respective casting drums, and then transported and fed between a pair of rotary dies that have matching die pockets. The two gel ribbons (or webs of paintball shell material) are thus brought together to form a single unitary web of paintball shell material which has a number of encapsulated pocket portions injected full of the paintball fill material. (The paintball fill material has heretofore been known to have been dispensed into the encapsulated pocket portions through an injection wedge located between the rotary dies.)

In the prior art, paintballs and other softgel capsules may have been somewhat costly to manufacture, due in no small part to the costs and materials associated with making the encapsulating shell. Discriminating consumers may have generally tended to prefer capsules of distinct colors. As such, in the prior art, it may have been rare and/or difficult for paintball or other capsule manufacturers to utilize recycled (hereinafter alternately referred to as "reclaimed") capsule materials.

What is needed, therefore, is a way by which a paintball manufacturer might make more economic use of recycled capsule materials, while still providing for substantially pleasing and/or desirable capsule color characteristics. There may also exist a need for improved technology relating to paintball shells, and/or a way by which a paintball manufacturer might more economically manufacture paintball shells.

Now, in the prior art, it may also have been known to use spreader boxes to create striped paintball shells from two different shell materials. Any such previous spreader boxes, however, have allowed for the blending of the two shell materials—with one shell material being dispensed through a series of laterally spaced discharge openings into the other shell material—just prior to both of these shell materials being together dispensed from the spreader box onto a casting drum.

Clearly, the blending of paintball shell materials is not acceptable where one of the objects is to completely cover-up an underlying shell layer with a laminating shell layer. But, regardless of whether or not such prior art spreader boxes may have sufficiently protected against the (non-discrete) blending of paintball shell materials, they have certainly not been capable of forming a truly bi-laminar web of paintball shell material, and instead may have only been partially successful in forming spotty and/or intermittently striped ones.

It is an object of the present invention to obviate or mitigate at least one of the aforementioned mentioned disadvantages of the prior art, and/or to achieve one or more of the aforementioned objects of the invention.

SUMMARY OF THE INVENTION

In accordance with the present invention, there is disclosed a spreader box apparatus for use with a first gel and a second gel to form a bi-laminar paintball shell material. The apparatus includes a box body and a gate body. The box body has box enclosure walls which define a box reservoir to contain, and a box aperture to dispense, the first gel. The gate body has gate enclosure walls which define a gate reservoir to contain, and a gate aperture to dispense, the second gel. According to the invention, substantially at every point within the apparatus, the first gel is kept separate and apart from the second gel. The box aperture operatively dispenses the first gel from the apparatus as a continuous first layer. The gate aperture operatively dispenses the second gel from the apparatus as a continuous second layer, in adjacent and substantially juxtaposed relation with the first layer. As such, the first gel bonds with the second gel to form the bi-laminar paintball shell material.

According to an aspect of one preferred embodiment of the invention, the apparatus also preferably includes mounting means, engaging both the gate body and the box body, for securely mounting the gate body on the box body.

According to an aspect of one preferred embodiment of the invention, the box body is shaped to define two box slots. The mounting means preferably includes a mounting bar and one or more leaf springs secured to the mounting bar. Preferably, the mounting means removably mounts the gate body on the box body. Opposing end portions of the mounting bar are preferably slidably received within the box slots. The leaf springs are preferably resiliently deformed against the gate body. As such, the gate body is preferably biased into secure removable engagement with the box body.

According to an aspect of one preferred embodiment of the invention, the gate body partially occludes the box aperture, such that the box aperture is preferably substantially adjacent to the gate aperture.

According to an aspect of one preferred embodiment of the invention, the apparatus is also for use with an operatively rotating casting drum. The box aperture preferably dispenses the first layer onto the rotating casting drum. The gate aperture preferably dispenses the second layer on top of the first layer.

According to an aspect of one preferred embodiment of the invention, at least one adjustable aperture and a corresponding adjustable layer are selected from: (a) the box aperture and the first layer, and (b) the gate aperture and the second layer. Preferably, the adjustable aperture is selectively adjustable, so as to selectively alter the thickness of the adjustable layer.

According to an aspect of one preferred embodiment of the invention, the apparatus also includes one or more thickness adjusting knobs, preferably, selectively operable to alter the adjustable aperture and/or the thickness of the adjustable layer.

According to an aspect of one preferred embodiment of the invention, the thickness adjusting knobs comprise two thickness adjusting knobs. Each of the thickness adjusting knobs is preferably selectively operable to independently alter one of the opposing side portions of the adjustable aperture and/or the thickness of the adjustable layer substantially adjacent thereto.

According to an aspect of one preferred embodiment of the invention, the adjustable aperture is the box aperture, and the adjustable layer is preferably the first layer.

According to an aspect of one preferred embodiment of the invention, at least one fixed aperture and a corresponding constant layer are selected from: (a) the box aperture and the first layer, and (b) the gate aperture and the second layer. The fixed aperture preferably has a non-adjustable shape and size. As such, the constant layer preferably has a predetermined and substantially constant thickness.

According to an aspect of one preferred embodiment of the invention, the fixed aperture is the gate aperture, and the constant layer is preferably the second layer.

According to an aspect of one preferred embodiment of the invention, the apparatus also includes a box supply valve, preferably, selectively movable between a box gel closed configuration and a box gel open configuration. In the box gel open configuration, the first gel is preferably supplied to the box reservoir.

According to an aspect of one preferred embodiment of the invention, the apparatus also includes a box float member operatively suspended, in buoyant relation, in the first gel contained within the box reservoir. The box float member is preferably adapted to move the box supply valve towards the box gel open configuration, preferably when the first gel drops below a first predetermined level within the box reservoir.

According to an aspect of one preferred embodiment of the invention, the apparatus also includes a gate gel supply valve selectively movable between a gate gel closed configuration and a gate gel open configuration. In the gate gel open configuration, the second gel is preferably supplied to the gate reservoir.

According to an aspect of one preferred embodiment of the invention, the apparatus also includes a gate float member operatively suspended, in buoyant relation, in the second gel contained within the gate reservoir. The gate float member is preferably adapted to move the gate supply valve towards the gate gel open configuration, preferably when the second gel drops below a second predetermined level within the gate reservoir.

According to an aspect of one preferred embodiment of the invention, the apparatus also includes at least one body heater, preferably, to operatively maintain the first gel and/or the second gel substantially within a desired temperature range.

According to an aspect of one preferred embodiment of the invention, the desired temperature range includes a desired first temperature range for the first gel. The box body is preferably shaped to define at least one box heater aperture.

The aforesaid at least one body heater preferably includes a box cartridge heater, preferably slidably received within the box heater aperture.

According to an aspect of one preferred embodiment of the invention, the desired temperature range includes a desired second temperature range for the second gel. The gate body is preferably shaped to define at least one gate heater aperture. The aforesaid at least one body heater preferably includes a gate cartridge heater, preferably slidably received within the gate heater aperture.

According to an aspect of one preferred embodiment of the invention, the apparatus also includes a temperature sensor operatively monitoring a temperature of at least one monitored gel. The aforesaid at least one monitored gel is the first gel, the second gel, or the first gel and the second gel. The temperature sensor is preferably adapted to supply heat energy from the body heater, preferably when the temperature of the monitored gel nears a lower limit of the desired temperature range.

According to an aspect of one preferred embodiment of the invention, the temperature sensor includes a thermocouple, preferably mounted substantially adjacent to the monitored gel.

According to an aspect of one preferred embodiment of the invention, the apparatus is adapted to form the first layer with a first thickness that is greater than or equal to about 0.0005 inches. Preferably, the first thickness is substantially within the range of between about 0.010 inches and about 0.100 inches. More preferably, the first thickness is about 0.025 inches.

According to an aspect of one preferred embodiment of the invention, the apparatus is adapted to form the second layer with a second thickness that is greater than or equal to about 0.0005 inches. Preferably, the second thickness is substantially within the range of between about 0.001 inches and about 0.030 inches. More preferably, the second thickness is about 0.005 inches.

According to an aspect of one preferred embodiment of the invention, the apparatus is preferably adapted to form the first layer as an interior shell surface, and/or the second layer as an exterior shell surface, of the bi-laminar paintball shell material.

According to an aspect of one preferred embodiment of the invention, the gate reservoir may preferably be adapted to contain a virgin gelatin as the second gel, and/or the box reservoir may preferably, but need not necessarily, be adapted to contain a reclaimed gelatin as the first gel.

In accordance with the present invention, there is also disclosed a gel spreading method of forming a bi-laminar paintball shell material. The method includes a first gel dispensing step and a second gel dispensing step. In the first gel dispensing step, a first gel is dispensed from a box reservoir through a box aperture as a continuous first layer. In the second gel dispensing step, a second gel is dispensed from a gate reservoir through a gate aperture as a continuous second layer, in adjacent and substantially juxtaposed relation with the first layer. As such, the first gel bonds with the second gel to form the bi-laminar paintball shell material.

According to an aspect of one preferred embodiment of the invention, the method also includes a gate mounting step, before the first gel dispensing step. In the gate mounting step, a gate body is preferably securely mounted on a box body. (The gate body has gate enclosure walls which preferably define the gate reservoir and the gate aperture, and the box body has box enclosure walls which preferably define the box reservoir and the box aperture.) Preferably, after the gate mounting step, the gate body partially occludes the box aperture, with the box aperture preferably positioned substantially adjacent to the gate aperture.

According to an aspect of one preferred embodiment of the invention, the method also includes a casting drum step of rotating a casting drum. In the first gel dispensing step, the first layer is dispensed through the box aperture, preferably onto the casting drum. In the second gel dispensing step, the second layer is dispensed through the gate aperture, preferably on top of the first layer.

According to an aspect of one preferred embodiment of the invention, the method also includes a thickness adjusting step. Preferably, in the thickness adjusting step, at least one adjustable aperture is selectively adjusted, preferably so as to selectively alter a thickness of a corresponding adjustable layer. The adjustable aperture and the corresponding adjustable layer are preferably selected from: (a) the box aperture and the first layer, and (b) the gate aperture and the second layer.

According to an aspect of one preferred embodiment of the invention, in the thickness adjusting step, the adjustable aperture is preferably adjusted by selectively operating one or more thickness adjusting knobs.

According to an aspect of one preferred embodiment of the invention, in the thickness adjusting step, the adjustable aperture is the box aperture, and the adjustable layer is preferably the first layer.

According to an aspect of one preferred embodiment of the invention, the method also includes a box supply step. Preferably, in the box supply step, a box supply valve is selectively moved towards a box gel open configuration, preferably so as to supply the first gel to the box reservoir, preferably when the first gel drops below a first predetermined level within the box reservoir.

According to an aspect of one preferred embodiment of the invention, the method also includes a gate supply step. Preferably, in the gate supply step, a gate supply valve is selectively moved towards a gate gel open configuration, preferably so as to supply the second gel to the gate reservoir, preferably when the second gel drops below a second predetermined level within the gate reservoir.

According to an aspect of one preferred embodiment of the invention, the method also includes a body heating step. Preferably, in the body heating step, at least one of the first gel and the second gel is operatively heated, preferably when its temperature nears a lower limit of a desired temperature range.

According to an aspect of one preferred embodiment of the invention, in the first gel dispensing step, the first layer is preferably formed as the interior shell surface of the bi-laminar paintball shell material. In the second gel dispensing step, the second layer is preferably formed as the exterior shell surface of the bi-laminar paintball shell material.

According to an aspect of one preferred embodiment of the invention, before the second gel dispensing step, a virgin gelatin is preferably provided as the second gel within the gate reservoir. Before the first gel dispensing step, a reclaimed gelatin may preferably, but need not necessarily, provided as the first gel within the box reservoir.

In accordance with the present invention, there is additionally disclosed a paintball for use with a paintball gun. The paintball includes a fill material and a frangible bi-laminar paintball shell containing the fill material. The paintball shell includes an interior shell and an exterior shell. The interior shell is formed of a first shell material. The interior shell completely surrounds and contains the fill material. The exterior shell is formed of a second shell material. The exterior shell is formed discretely from the interior shell. The exterior shell completely surrounds and contains the interior shell. The paintball is adapted to withstand a normal range of forces ordinarily sustained in being fired from the paintball gun.

According to the present invention, the paintball may preferably (but need not necessarily) be advantageously adapted to break upon impact after having been fired from the paintball gun, so as to release the fill material.

According to an aspect of one preferred embodiment of the invention, the interior shell has an interior shell thickness that is greater than or equal to about 0.0005 inches. Preferably, the interior shell thickness is substantially within the range of between about 0.010 inches and about 0.100 inches. More preferably, the interior shell thickness is about 0.025 inches.

According to an aspect of one preferred embodiment of the invention, the exterior shell has an exterior shell thickness that is greater than or equal to about 0.0005 inches. Preferably, the exterior shell thickness is substantially within the range of between about 0.001 inches and about 0.030 inches. More preferably, the exterior shell thickness is about 0.005 inches.

According to an aspect of one preferred embodiment of the invention, the second shell material may preferably be a virgin gelatin, and/or the first shell material may preferably, but need not necessarily, be a reclaimed gelatin.

It is thus an object of this invention to obviate or mitigate at least one of the above mentioned disadvantages of the prior art.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the spreader box apparatus, the method of forming bi-laminar paintball shells, and the paintballs according to the present invention, as to their structure, organization, use and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings:

FIG. 7A is a sectional view of a paintball according to a preferred embodiment of the present invention; and FIG. 7B is an enlarged view of encircled area 7B in FIG. 7A.

DETAILED DESCRIPTION OF A PREFERRED EMBODIMENT

Figure 1A:
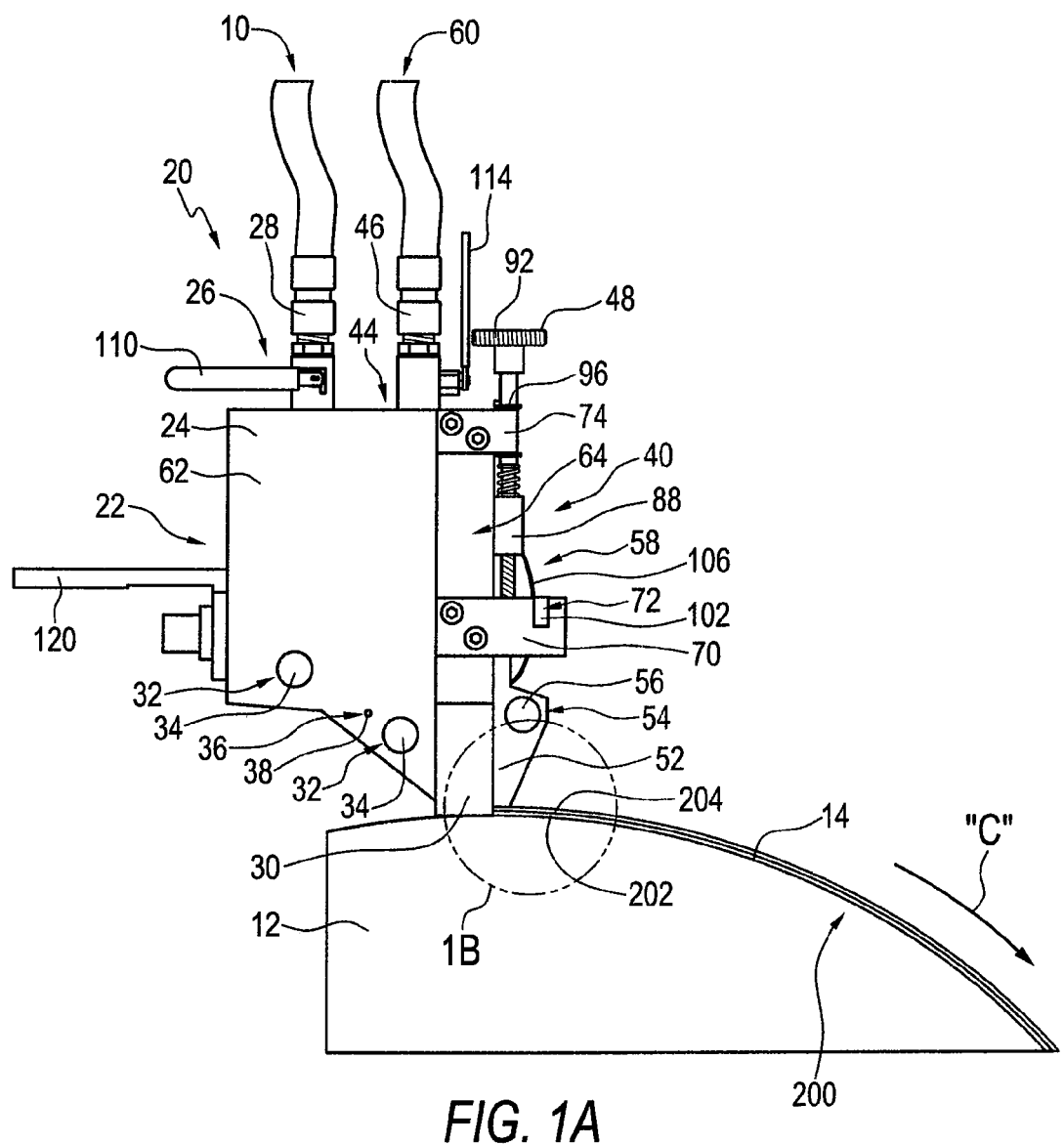
FIG. 1A is a left side elevational view of a spreader box apparatus according to a preferred embodiment of the present invention, shown in use with first and second gels, and a casting drum.

Now, with reference to FIGS. 1A to 6B, there is shown a spreader box apparatus 20 for use with a first gel 10, a second gel 60, and an operatively rotating casting drum 12. A segment of one such, generally cylindrical, casting drum 12 is shown in FIGS. 1A and 1B.

As best seen in FIGS. 2B, 3B, 4B, 5B and 6B, the apparatus 20 includes (among other things) a box body 22, a gate body 40, and mounting means 58 for securely and removably mounting the gate body 40 on the box body 22. A spreader box mounting portion 120 is shown in each of FIGS. 1A and 2A-5B, and may be used to mount the apparatus 20 on a support member (not shown) adjacent the casting drum 12.

Figure 1B:
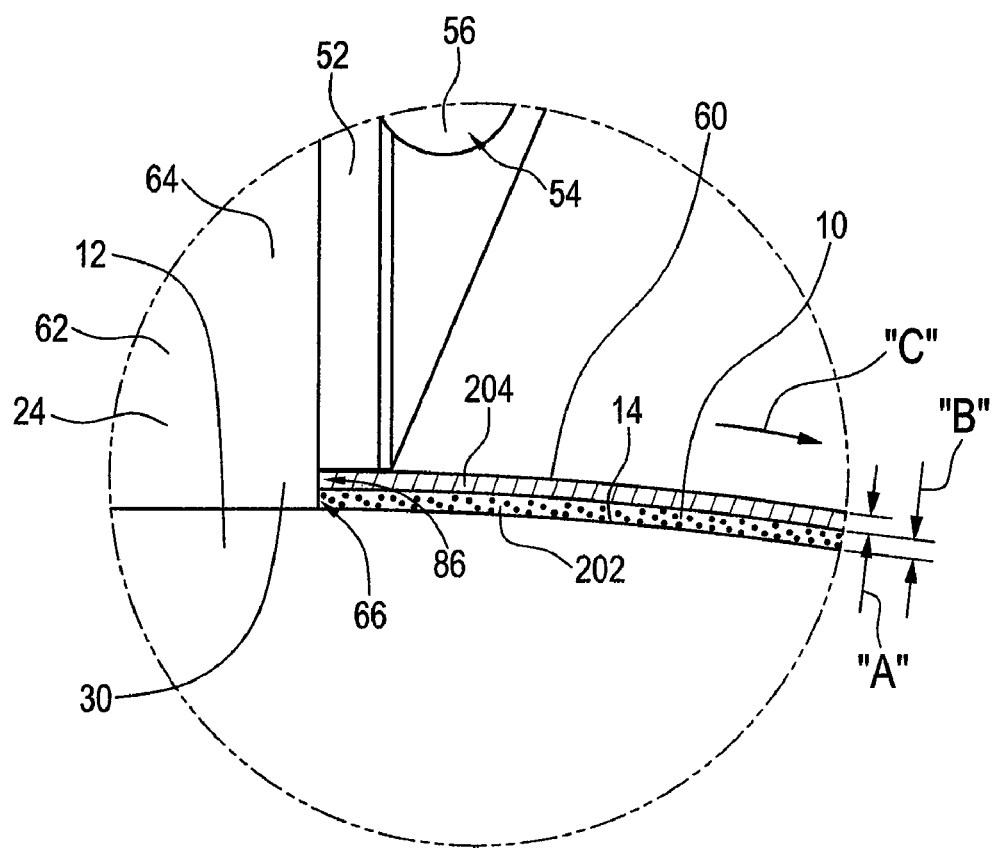
FIG. 1B is an enlarged view of encircled area 1B in FIG. 1A.
Figure 2A:
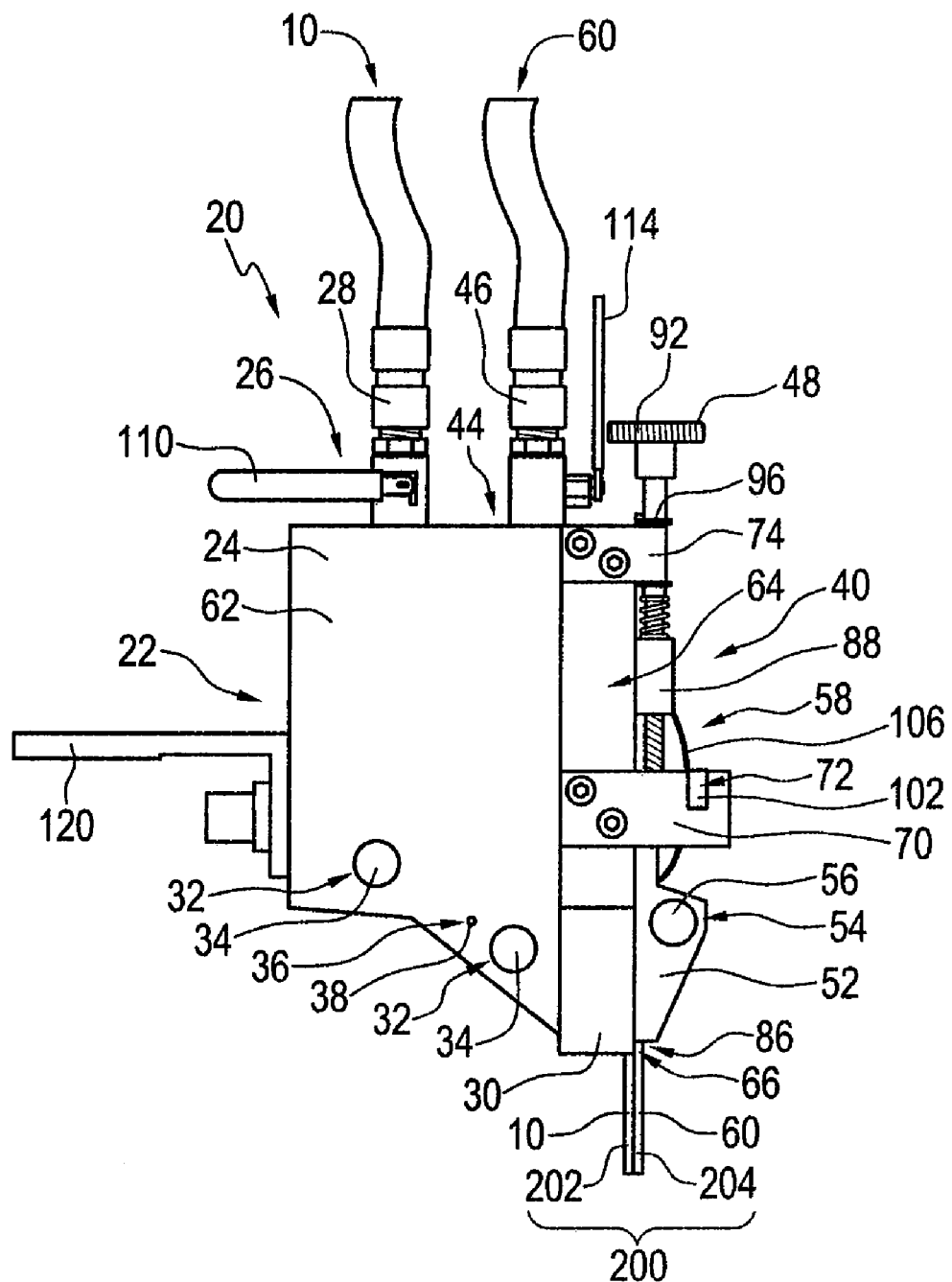
FIG. 2A is a left side elevational view of the apparatus of FIG. 1A, shown in use with the first and second gels.
Figure 2B:
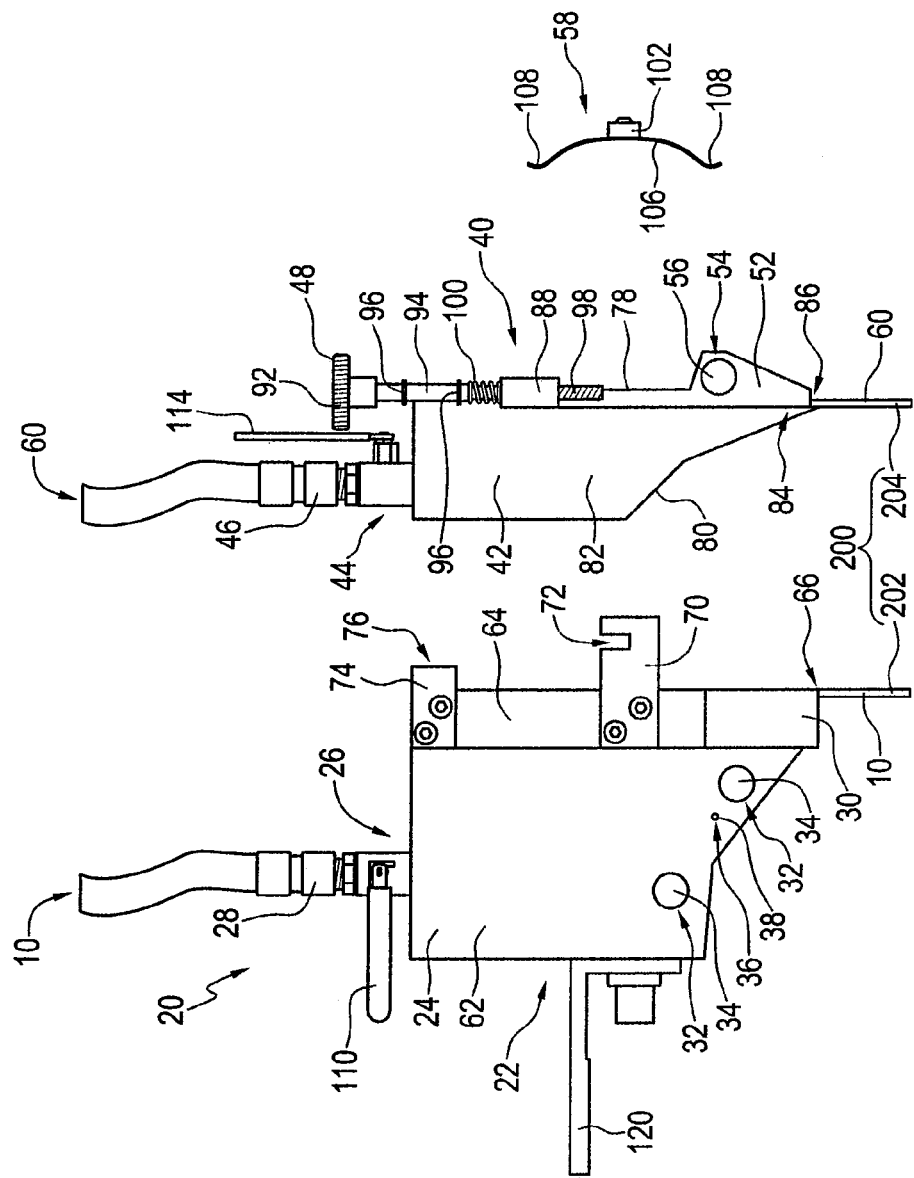
FIG. 2B is an exploded side view of the apparatus shown in FIG. 2A.
Figure 3A:
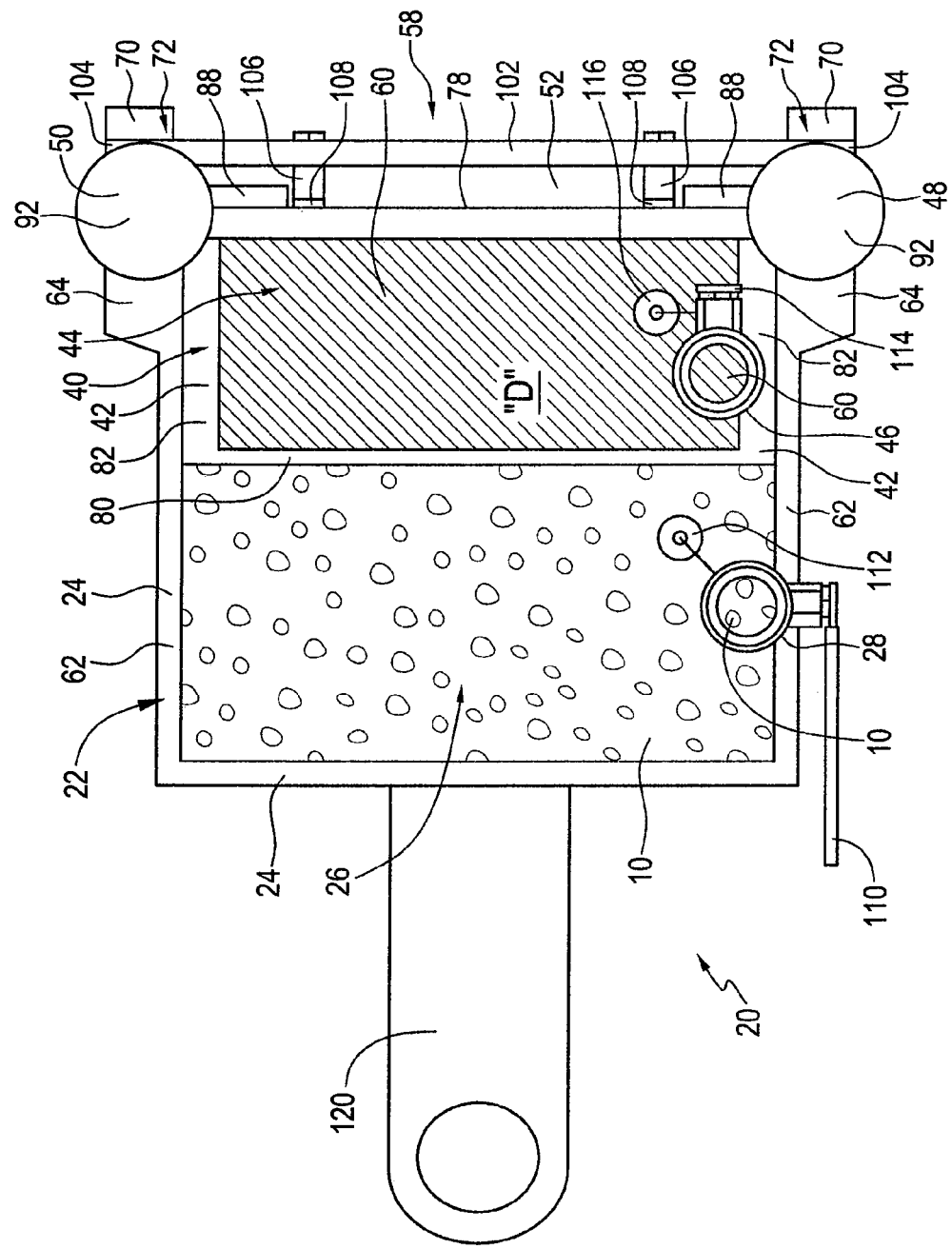
FIG. 3A is a top plan view of the apparatus shown in FIG. 2A.

As best seen in FIG. 3A, the box body 20 has box enclosure walls 24 which define a box reservoir 26 that operatively contains the first gel 10. A bottom portion 30 of the box enclosure walls 24 defines a box aperture 66 which operatively dispenses the first gel 10 (as best seen in FIGS. 1B and 2B).

Figure 6A:
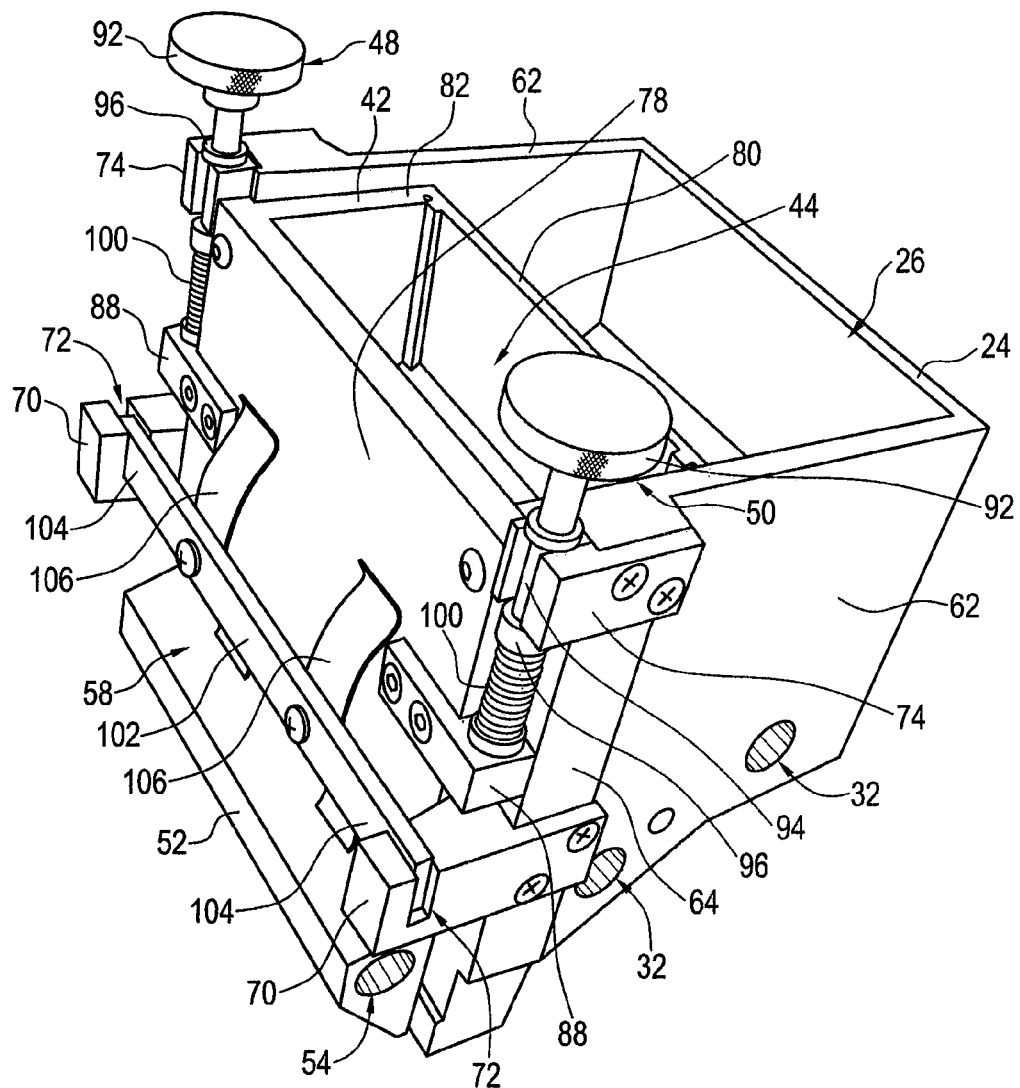
FIG. 6A is a front top right perspective view of a the apparatus shown in FIG. 4A.
Figure 6B:
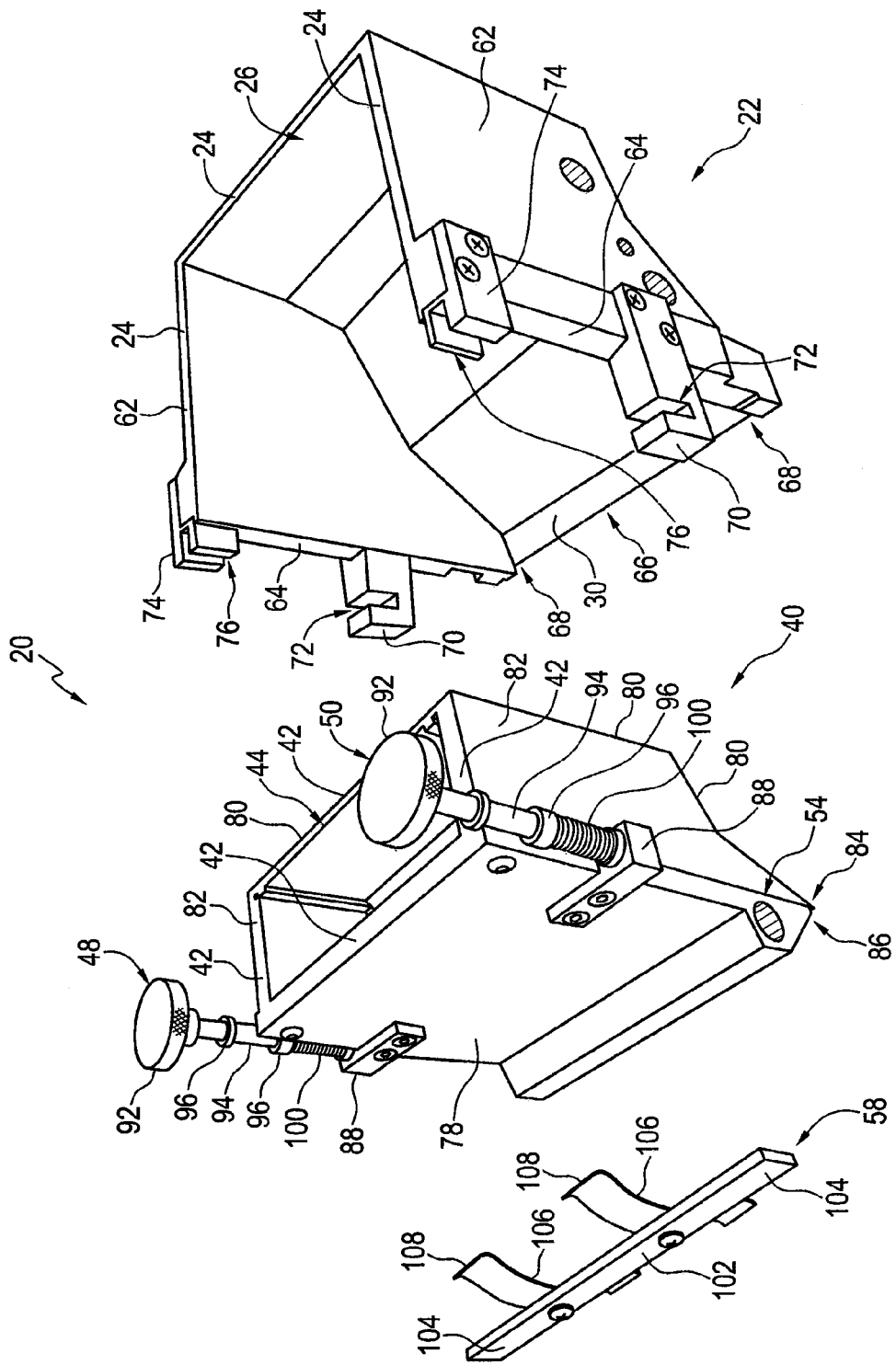
FIG. 6B is an exploded perspective view of the apparatus shown in FIG. 6A.

Preferably, and as best seen in FIG. 6B, the box enclosure walls 24 include two opposing box side walls 62,62. Two lower box arms 70,70 extend, one each, from a respective front portion 64 of each of the box side walls 62,62. Each lower box arm 70 is shaped to define a box slot 72.

Figure 4A:
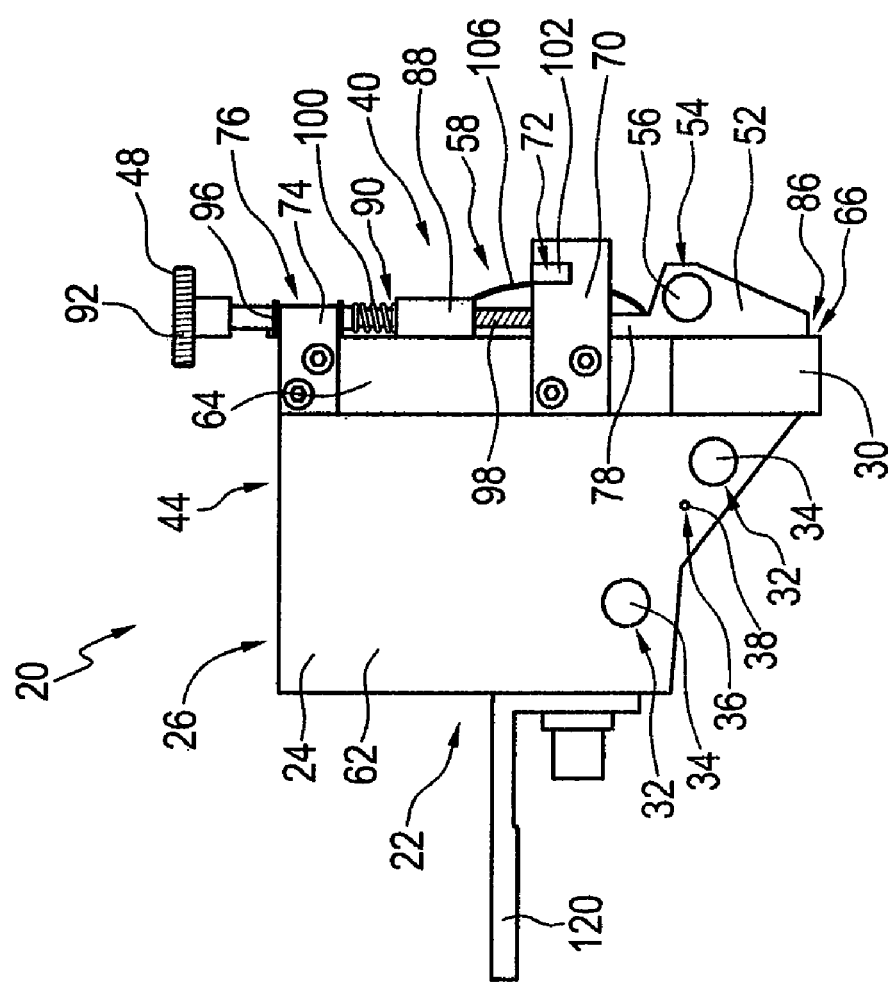
FIG. 4A is a left side elevational view of the apparatus shown in FIG. 2A, shown without box and gate supply valves thereof, and without the first and second gels.
Figure 4B:
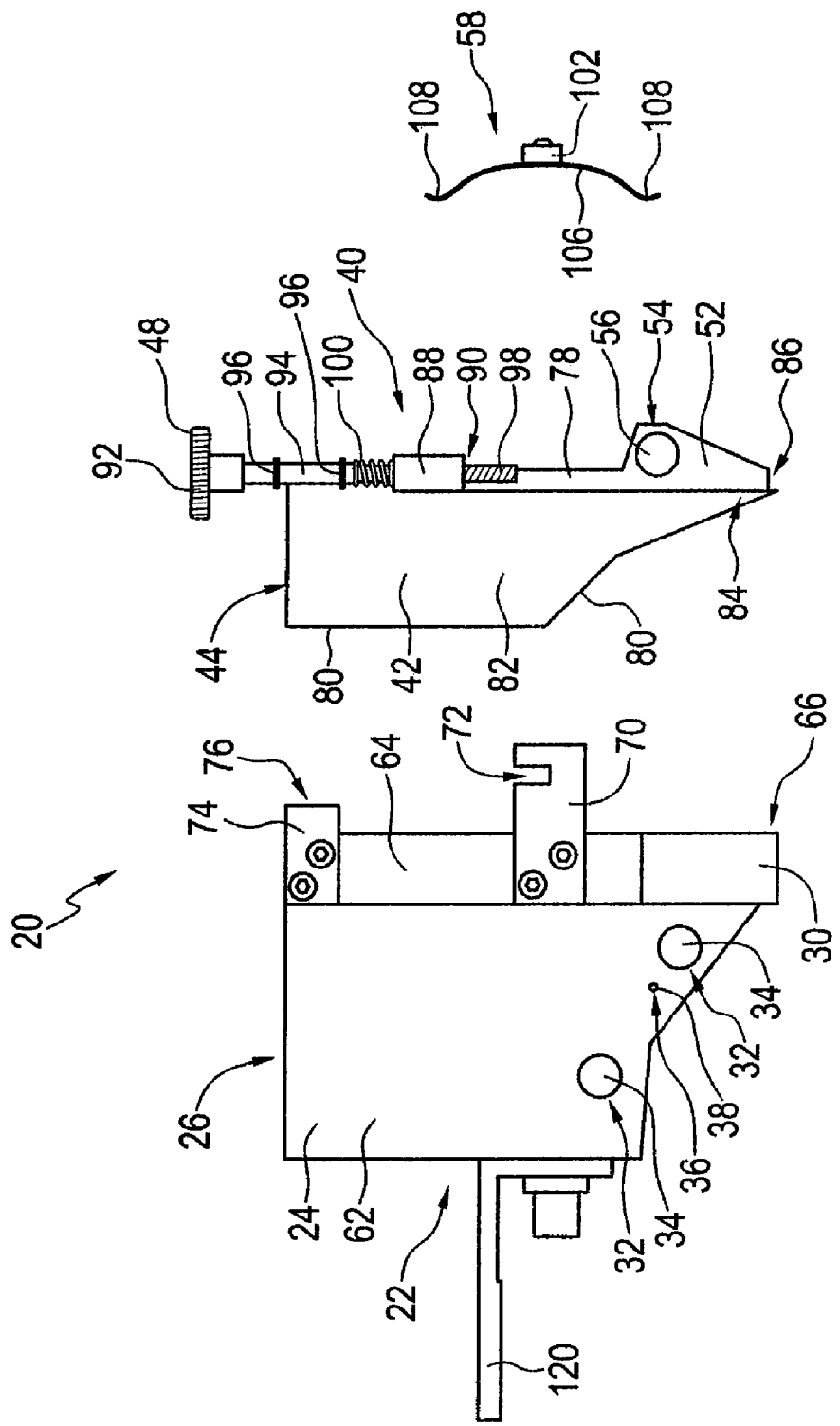
FIG. 4B is an exploded side view of the apparatus shown in FIG. 4A.

As best seen in FIG. 3A, the gate body 40 has gate enclosure walls 42 which define a gate reservoir 44 that operatively contains the second gel 60. Preferably, and as best seen in FIGS. 3A and 6B, the box enclosure walls 24 include a gate front wall 78, a gate rear wall 80, and two opposing gate side walls 82,82. Respective bottom portions 52, 84 of the gate front and rear walls 78, 80 together define a gate aperture 66 (as best seen in FIGS. 2B and 4B) to dispense the second gel 60 (as shown in FIGS. 1B and 2B).

As best seen in FIG. 6A, the mounting means 58 engages both the gate body 40 and the box body 22. The mounting means 58 is alternately hereinafter referred to as a "retention spring 58" according to one preferred embodiment of the invention. Preferably, it includes a mounting bar 102 and two leaf springs 106,106 secured thereto. When the gate body 40 is securely and removably mounted on the box body 22 as aforesaid, opposing end portions 104,104 of the mounting bar 102 are slidably received within the box slots 72,72. Contacting portions 108,108 of the leaf springs 106,106 are resiliently deformed against the gate front wall 78. In this manner, the gate body 40 is biased into secure removable engagement with the box body 22.

Figure 5A:
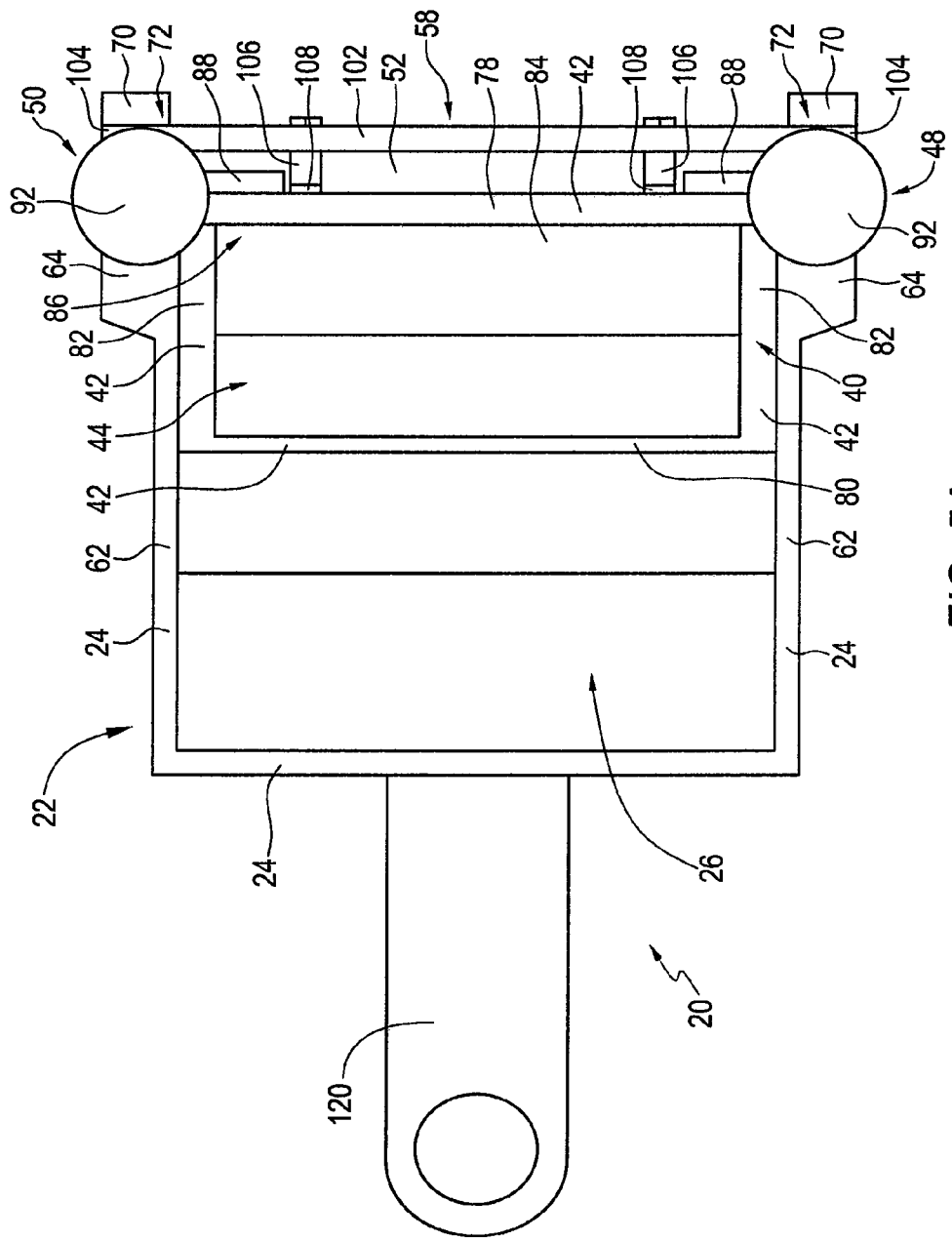
FIG. 5A is a top plan view of the apparatus shown in FIG. 4A.
Figure 5B:
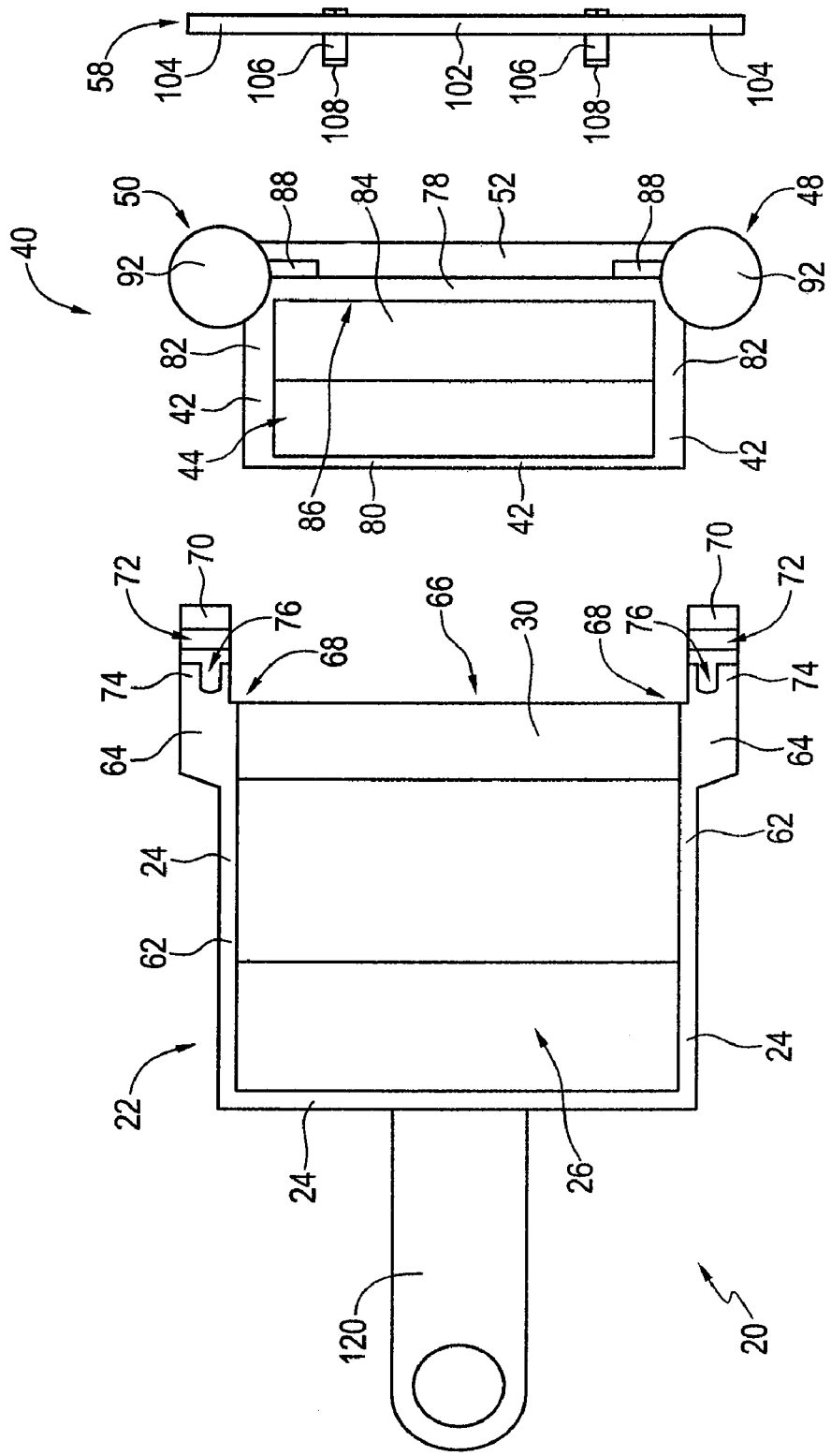
FIG. 5B is an exploded top view of the apparatus shown in FIG. 5A.

As may be best appreciated from a consideration of FIGS. 1B and 5B, the gate body 40 partially occludes the box aperture 66 when the gate body 40 is securely and removably mounted on the box body 22 as aforesaid. It will additionally be appreciated that, in this configuration, the box aperture 66 is substantially adjacent to the gate aperture 86.

It should also be noted, as best seen in FIG. 3A, that the first gel 10 is kept separate and apart from the second gel 20 at substantially every point within the apparatus 20.

With further reference to FIGS. 1A and 1B, as the casting drum 12 rotates (in the direction generally indicated by arrow "C"), the box aperture 66 operatively dispenses the first gel 10 from the apparatus 20 as a continuous first layer 202 onto a gel receiving surface 14 thereof. At the same time, the gate aperture 86 operatively dispenses the second gel 60 from the apparatus 20 as a continuous second layer 204. As best seen in FIG. 1B, the continuous second layer 204 is preferably dispensed in adjacent and substantially juxtaposed relation with (and, preferably, on top of) the first layer 202. In this manner, the spreader box apparatus 20 is operable to afford the first gel 10 an opportunity to bond with the second gel 60, and so as to form a continuous web of bi-laminar paintball shell material 200.

As discussed elsewhere herein, prior art techniques may be generally well-known to use rotary dies and an injection wedge in forming paintballs from two webs of shell material emanating from respective casting drums. Notably, according to the present invention, the first and second layers 202, 204 of the bi-laminar paintball shell material 200 may preferably, but need not necessarily, be used to form interior and exterior shell surfaces 302, 304, respectively, of a paintball 300 that also lies within the scope of the present invention (as best seen in FIG. 7B).

As shown in FIGS. 7A and 7B, the paintball 300 disclosed according to the present invention includes a fill material 320 contained within a frangible bi-laminar paintball shell 310. The paintball shell 310 is formed as two discrete and continuous layers, namely, an interior shell 312 and a discrete exterior shell 314. The interior and exterior shells 312, 314 may, according to some (but not all) preferred embodiments of the present invention, be formed from the first and second gels, 10 and 60 respectively. As such, the first and second gels 10, 60 may alternately hereinafter be referred to as the "interior shell material 10" and the "exterior shell material 60". According to the present invention, the interior shell 312 completely surrounds and contains the fill material 320, and the exterior shell 314 completely surrounds and contains the interior shell 312. The paintball 300 according to the present invention is adapted for use with a paintball gun (not shown). As such, the paintball 300 is adapted to withstand a normal range of forces ordinarily sustained in being fired from the paintball gun. The shell 310 of the paintball 300 is also preferably adapted to break upon impact after having been fired from the paintball gun (not shown), so as to release the fill material 320.

Now, in the preferred embodiment of the apparatus 20 shown in the drawings, the box aperture 66 is selectively adjustable, so as to selectively alter a thickness (as indicated generally by dimension "B" in FIG. 1B) of the first layer 202. As such, and as may also be described in detail elsewhere herein, the first layer 202 is preferably a layer of adjustable thickness "B" (and is alternately hereinafter referred to as an "adjustable layer 202"). Similarly, the box aperture 66 is alternately hereinafter referred to as an "adjustable aperture 66".

The apparatus 20, and its box aperture 66, are preferably adapted to form the first layer 202 with a thickness "B" that is greater than or equal to about 0.0005 inches. Preferably, the thickness "B" is substantially within the range of between about 0.010 inches and about 0.100 inches. More preferably, the thickness "B" is about 0.025 inches.

To enable selective adjustment of the adjustable layer 202, the apparatus 20 also preferably includes two thickness adjusting knobs 48, 50. Preferably, each of the thickness adjusting knobs 48, 50 includes a threaded gate mounting portion 98, a box retention portion 94, and a handle portion 92. As best seen in FIG. 6B, the gate body 40 preferably has two gate arms 88,88. As best seen in FIGS. 2B and 4B, each gate arm 88 is shaped to define a knob mounting aperture 90 which securely and threadingly receives the gate mounting portion 98.

Figure 3B:
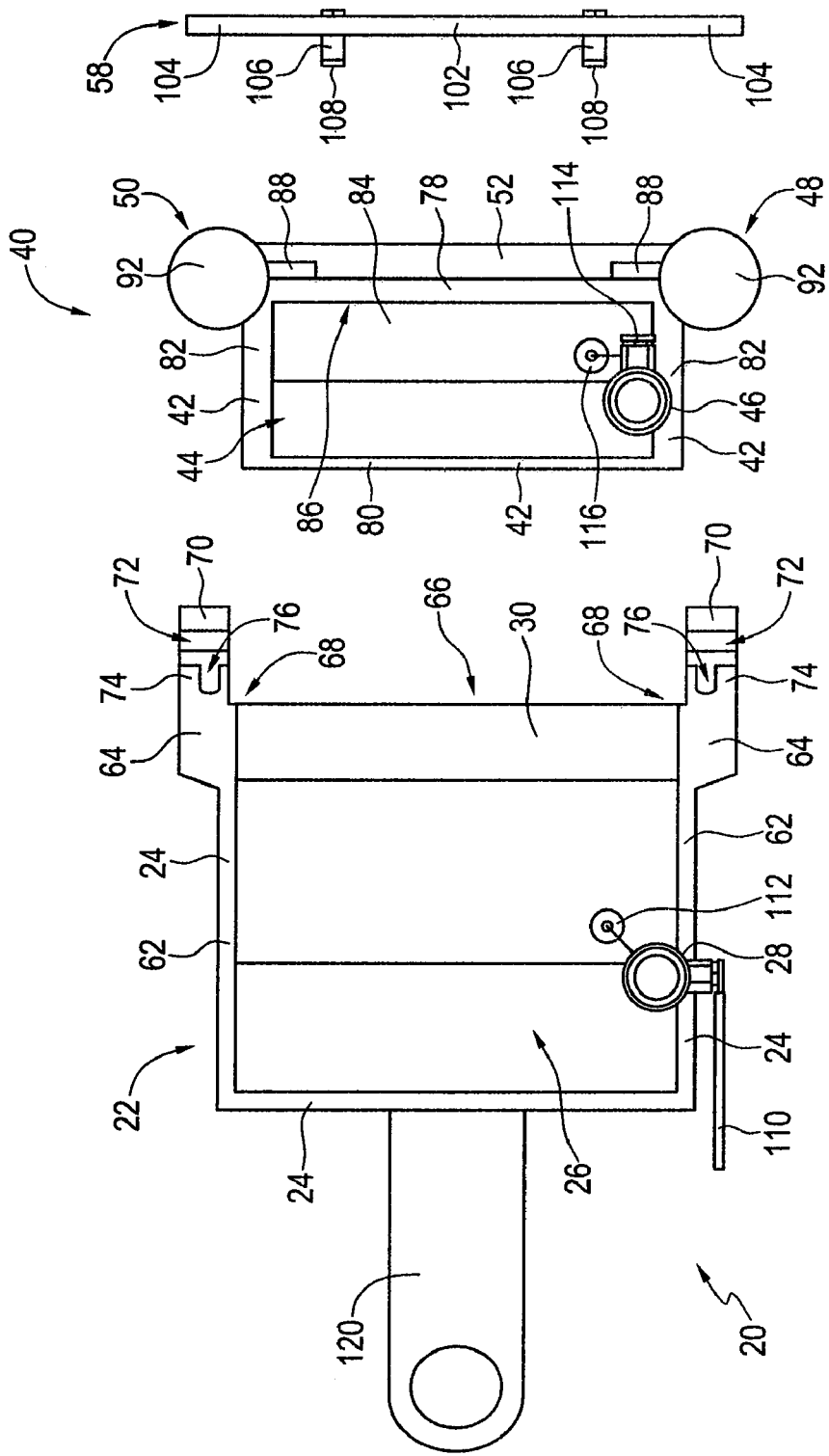
FIG. 3B is an exploded top view of the apparatus shown in FIG. 3A.

As best seen in FIGS. 3B, 5B and 6B, the box body 22 includes two upper box clips 74, 74. As will be best appreciated from a consideration of FIGS. 2B, 3B-4B and 5B-6B, each box retention portion 94 is adapted to be securely received within a U-shaped knob holder 76 of each upper box clip 74. Two stop members 96,96 of each box retention portion 94 securely engage top and bottom portions of each upper box clip 74. A biasing member 100—e.g., a spring—is also provided on each of the thickness adjusting knobs 48, 50 (and may be adapted to bias a lower one of the stop members 96 into secure engagement with the upper box clip 74, and/or to bias the gate body 40 towards a closed configuration for the box aperture 66).

Preferably, the handle portions 92,92 of the thickness adjusting knobs 48, 50 are selectively operable to adjust the box aperture 60 and the thickness "B" of the first layer 202. Preferably, each of the thickness adjusting knobs 48, 50 is selectively and independently operable to adjust one of the opposing side portions 68,68 of the adjustable aperture 66 (and the thickness "B" of the adjustable layer 202 substantially adjacent thereto).

In the preferred embodiment shown in the figures, the gate aperture 86 has a non-adjustable shape and size, and the second layer 204 has a predetermined and substantially constant thickness (as indicated generally by arrow "A" in FIG. 1B). As such, and as may also be described in detail elsewhere herein, the second layer 204 is preferably (though not necessarily) a layer of constant thickness "A". The second layer 204 is alternately hereinafter referred to as a "constant layer 204", and similarly, the gate aperture 86 is alternately hereinafter referred to as a "fixed aperture 86". (It is worthwhile to specifically note that certain alternate embodiments of the present invention may provide for adjustment of the gate aperture 86, so as to likewise enable adjustment of the thickness "A" of the second layer 204.)

The apparatus 20 is nonetheless preferably adapted to form the second layer 204 with a thickness "A" that is greater than or equal to about 0.0005 inches. Preferably, the thickness "A" is substantially within the range of between about 0.001 inches and about 0.030 inches. More preferably, the thickness "A" is about 0.005 inches. (At this stage, it is worthwhile to note that the relative respective preferable thicknesses, "B" and "A", of the first and second layers 202, 204 are not shown to scale in FIGS. 1A-2B. Rather, it will be appreciated that a better representation of these relative preferable thicknesses, "B" and "A", is illustrated in the depiction of a paintball 300 according to the present invention in FIG. 7B.)

Preferably, the apparatus 20 includes a box supply valve 28 and a box valve handle 110 which are, together, selectively movable between a box gel closed configuration (as shown in FIGS. 1A and 2A-3B) and a box gel open configuration (not shown). In the box gel open configuration, the first gel 10 is supplied to the box reservoir 26. As shown in FIG. 3A, a box float member 112 is operatively suspended, in buoyant relation, in the first gel 10 contained within the box reservoir 26. The box float member 112 is adapted to move the box supply valve 28 towards the box gel open configuration (not shown) when the first gel 10 drops below a first predetermined level (not shown) within the box reservoir 26.

A gate supply valve 46 and a gate valve handle 114 of the apparatus 20 are, preferably together, selectively movable between a gate gel closed configuration (not shown) and a gate gel open configuration (as shown in FIGS. 1A and 2A-3B). In the gate gel open configuration, the second gel 60 is supplied to the gate reservoir 44. As shown in FIG. 3A, a gate float member 116 is operatively suspended, in buoyant relation, in the second gel 60 contained within the gate reservoir 44. The gate float member 116 is adapted to move the gate supply valve 46 towards the gate gel open configuration (as shown in FIG. 3A) when the second gel 60 drops below a second predetermined level (as indicated generally by surface "D") within the gate reservoir 44.

The apparatus 20 also preferably includes three body heaters 34, 34, 56 to operatively maintain the first gel 10 and the second gel 60 substantially within a desired temperature range for each. The box body 22 is preferably shaped to define two box heater apertures 32, 32 and a box sensor aperture 36 (as best shown in FIGS. 6A and 6B). Similarly, the gate body 40 is preferably shaped to define a gate heater aperture 54. The body heaters preferably include two box cartridge heaters 34,34 and a gate cartridge heater 56. As best seen in FIG. 4B, the box cartridge heaters 34, 34 are slidably received, one each, within the box heater apertures 32, 32, and the gate cartridge heater 56 is slidably received within the gate heater aperture 54.

Preferably, a temperature sensor (preferably a thermocouple) 38 of the apparatus 20 is mounted within the box sensor aperture 36 substantially adjacent to the monitored gels 10, 60. The temperature sensor 38 is operative to monitor a temperature of the first gel 10 and the second gel 60. The temperature sensor 38 preferably works in tandem with the body heaters 34, 34, 56 to supply heat energy to the apparatus 20 when the temperature of the monitored gels 10, 60 nears a lower limit of their desired temperature ranges.

As aforesaid, the box reservoir 26 is adapted to contain the first gel 10, and the gate reservoir 44 is adapted to contain the second gel 60. Notably, according to some preferred embodiments of the present invention, the first gel 10 may be a virgin gelatin that has a different formulation and/or different characteristics than the second gel 60. The first gel 10 may, according to other preferred embodiments that lie within the scope of the invention, even be a reclaimed or recycled gelatin. The second gel 60 may preferably (but need not necessarily) be a virgin gelatin. Of course, according to the present invention, it is also conversely possible for box reservoir 26 to be adapted to contain the second gel 60, and for the gate reservoir 44 to be adapted to contain the first gel 10.

Notably, the second gel 60 may be a laminating gel, insofar as it may be used to completely cover-up the underlying first layer 202. In this way, and especially when the first gel 10 may be formed from reclaimed capsule materials with imperfect optical or other characteristics, the present invention may still provide for substantially pleasing and/or desirable capsule color characteristics in the laminate second layer 204. It is worthwhile to also note that the scope of the present invention includes a spreader box apparatus and method of forming paintball shell materials, paintballs, and other softgel capsules having three layers (i.e., a "tri-laminar" structure) or even more.

According to the invention, the apparatus 20 may be used in accordance with a novel and inventive method that preferably includes each of the following steps:

a second gel thickness adjusting step,
a gate mounting step,
a first gel thickness adjusting step,
a heater mounting step,
a thermocouple mounting step,
a body heating step,
a first gel dispensing step,
a second gel dispensing step,
a casting drum step,
a box supply step, and
a gate supply step.

In the second gel thickness adjusting step, the thickness "A" of the second layer 204 may preferably be set. Preferably, the second gel thickness adjusting step will occur prior to assembly of the apparatus 20. In some embodiments of the apparatus 20 that fall within the scope of the invention, the second gel thickness adjusting step may preferably be performed when mounting the gate front wall 78 and its bottom portion 52 (alternately herein referred to as the "second gel gate 52") on the remainder of the gate enclosure walls 42.

In the gate mounting step, the gate body 40 is securely mounted on the box body 22. The gate body 40 partially occludes the box aperture 66. As such, the box aperture 66 is positioned substantially adjacent to the gate aperture 86.

In the first gel thickness adjusting step, the thickness "B" of the first gel 10 will preferably be adjusted by means of the thickness adjustment knobs, 48 and 50, which preferably allow independent adjustment. Alternately, in the thickness adjusting step, the adjustable aperture 66 is selectively adjusted by selectively operating the thickness adjusting knobs, 48 and 50, so as to selectively alter the thickness "B" of the corresponding adjustable layer 202.

In the heater mounting step, the box cartridge heaters 34, 34 and the gate cartridge heater 56 are preferably placed into the box heater apertures 32, 32 and the gate heater aperture 54 respectively.

In the thermocouple mounting step, the thermocouple 38 is preferably mounted on the box body 22 in substantial proximity to, and preferably (according to the present invention) inside of, the box sensor aperture 36. It is perhaps worthwhile to specifically note that certain alternate embodiments of the apparatus 20 provide for alternate methods of mounting the temperature sensor 38—e.g., tacking. Preferably, however, the mounting of the temperature sensor 38 will afford a measure of control over, and/or an ability to maintain, operating temperatures at, near, below, and/or above a certain temperature and/or within a predetermined range of temperatures.

In the body heating step, and preferably whilst monitoring the thermocouple 38, the box 20 (and the first and second gels 10, 60 contained therewithin) will preferably be heated to a desired temperature using the body heaters 34, 34, 56. Alternately, in the body heating step, the first gel 10 and the second gel 60 are operatively heated when their temperature near a lower limit of a desired temperature range for each.

Before the first gel dispensing step, a virgin, reclaimed and/or recycled gelatin may be provided as the first gel 10 within the box reservoir 26.

In the first gel dispensing step, the first gel 10 preferably flows and/or is dispended from the bottom portion 30 of the box enclosure walls 24. The first gel 10 is preferably dispensed, through the box aperture 66, onto the casting drum 12 as the continuous first layer 202. In the first gel dispensing step, the first layer 202 may preferably be formed as the interior shell surface 302 of the web of bi-laminar paintball shell material 200.

Before the second gel dispensing step, a virgin (or other) gelatin may be provided as the second gel 60 within the gate reservoir 44.

In the second gel dispensing step, the second gel 60 is dispensed from the gate reservoir 44, through the gate aperture 86 as the continuous second layer 204, in adjacent and substantially juxtaposed relation with (and preferably on top of) the first layer 202. In the second gel dispensing step, the second layer 204 is preferably formed as the exterior shell surface 304 of the web of bi-laminar paintball shell material 200.

In the casting drum step, the casting drum is rotated, and the first and second gels 10, 60 preferably bond with one another (see FIGS. 1A and 1B) to form a web of the bi-laminar paintball shell material 200.

In the box supply step, and preferably after (and/or substantially contemporaneous with) the aforementioned body heating step, the first gel 10 will preferably be supplied and/or fed to the box reservoir 26 through the box supply valve 28. Alternately, in the box supply step, the box supply valve 28 may preferably be automatically moved towards the box gel open configuration (not shown), so as to supply the first gel 10 to the box reservoir 26, when the first gel 10 drops below the first predetermined level (not shown) within the box reservoir 26.

In the gate supply step, and preferably after (and/or substantially contemporaneous with) the aforementioned body heating step, the second gel 60 will preferably be supplied and/or fed to the gate reservoir 44 through the gate supply valve 46. Alternately, in the gate supply step, the gate supply valve 46 may preferably be automatically moved towards the gate gel open configuration (shown in FIGS. 1A and 2A-3B), so as to supply the second gel 60 to the gate reservoir 44, when the second gel 60 drops below the second predetermined level "D" within the gate reservoir 44.

In the aforesaid manner, the second gel 60 may preferably be formed—and/or applied, molded, extruded, injected, placed, and/or layered—on top of the first gel 10. It is important to once again note, however, that it is within the scope of the invention to reverse the above-described process, whereby the first gel 10 may instead be placed on top of the second gel 60, if desired. The thicknesses, "B" and "A", of either or both gels 10, 60 may preferably be adjusted to meet production requirements.

The division of the two gels 10, 60 within the apparatus 20 is preferably created and maintained by the gate enclosure walls 42.

Uniform temperature may preferably be maintained between both gels 10, 60 by the use of brass, aluminum and/or any other materials which may be preferable and/or suitable for the construction of the components. Alternately, each gel may have its own separate desired temperature range. Each gel 10, 60 is preferably provided with at least one cartridge heater 34, 56 of its own. The thermocouple 38 may preferably provide and/or enable substantially constant monitoring of the temperature of the apparatus 20.

Other modifications and alterations may be used in the design and manufacture of other embodiments according to the present invention without departing from the spirit and scope of the invention, which is limited only by the accompanying claims of this application.

I claim:

1. A gel spreading method of forming a bi-laminar paintball shell material, the method comprising the steps of:

dispensing a reclaimed gelatin from a box reservoir through a box aperture as a continuous first layer; and dispensing a virgin gelatin from a gate reservoir through a gate aperture as a continuous second layer, in adjacent and substantially juxtaposed relation with the first layer, such that the reclaimed gelatin bonds with the virgin gelatin to form the bi-laminar paintball shell material, wherein the first layer is formed as the interior shell surface of the bi-laminar paintball shell material, and the second layer is formed as the exterior shell surface of the bi-laminar paintball shell material.

2. A method according to claim 1, further comprising a gate mounting step, before the step of dispensing reclaimed gelatin, of securely mounting a gate body, having gate enclosure walls which define the gate reservoir and the gate aperture, on a box body having box enclosure walls which define the box reservoir and the box aperture; wherein after the gate mounting step, the gate body partially occludes the box aperture, with the box aperture positioned substantially adjacent to the gate aperture.

3. A method according to claim 1, further comprising a casting drum step of rotating a casting drum; and wherein in the dispensing reclaimed gelatin step, the first layer is dispensed through the box aperture onto the casting drum, and in the dispensing virgin gelatin step, the second layer is dispensed through the gate aperture on top of the first layer.

4. A method according to claim 1, further comprising a thickness adjusting step of selectively adjusting at least one adjustable aperture, so as to selectively alter a thickness of a corresponding adjustable layer, with the adjustable aperture and the corresponding adjustable layer being selected from: (a) the box aperture and the first layer, and (b) the gate aperture and the second layer, wherein selectively adjusting the box aperture is independent of selectively adjusting the gate aperture.

5. A method according to claim 4, wherein in the thickness adjusting step, the adjustable aperture is adjusted by selectively operating one or more thickness adjusting knobs.

6. A method according to claim 4, wherein in the thickness adjusting step, the adjustable aperture is the box aperture, and the adjustable layer is the first layer.

7. A method according to claim 1, further comprising a box supply step of selectively moving a box supply valve towards a box gel open configuration, so as to supply the reclaimed gelatin to the box reservoir, when the reclaimed gelatin drops below a first predetermined level within the box reservoir.

8. A method according to claim 1, further comprising a gate supply step of selectively moving a gate supply valve towards a gate gel open configuration, so as to supply the virgin gelatin to the gate reservoir, when the virgin gelatin drops below a second predetermined level within the gate reservoir.

9. A method according to claim 1, further comprising a body heating step of operatively heating at least one of the reclaimed gelatin and the virgin gelatin when the temperature of the reclaimed gelatin or the virgin gelatin nears a lower limit of a desired temperature range.

10. A method according to claim 1, wherein before the second gel dispensing step, the virgin gelatin is provided within the gate reservoir.

11. A method according to claim 1, wherein before the first gel dispensing step, the reclaimed gelatin is provided within the box reservoir.

* * * * *